United States Patent [19]
Chambers et al.

[11] Patent Number: 4,464,092
[45] Date of Patent: Aug. 7, 1984

[54] BOAT TRAILER

[76] Inventors: J. Bruce Chambers, Rte. #1, Lindenhurst Rd.; Donald D. Paul, 1060 Creamery Rd., both of Yardley, Pa. 19067

[21] Appl. No.: 345,999

[22] Filed: Feb. 5, 1982

[51] Int. Cl.³ .............................................. B60P 3/10
[52] U.S. Cl. ..................................... 414/534; 193/37; 280/414.1; 414/538
[58] Field of Search ............... 414/494, 529, 532, 533, 414/534, 538, 559; 280/414.1; 193/37

[56] References Cited

U.S. PATENT DOCUMENTS

| | | | |
|---|---|---|---|
| 3,155,249 | 11/1964 | Johnson | 414/538 X |
| 3,210,049 | 10/1965 | Holsclaw | 414/559 X |
| 3,403,798 | 10/1968 | Flachbarth et al. | 414/535 X |
| 3,512,667 | 5/1970 | Calkins | 414/534 X |
| 3,756,439 | 9/1973 | Johnson | 414/534 |
| 3,785,677 | 1/1974 | Calkins | 414/534 X |
| 3,812,986 | 5/1974 | Rogers | 414/534 |
| 3,888,367 | 6/1975 | Cox | 414/534 |
| 3,892,320 | 7/1975 | Moore | 414/534 |
| 3,917,087 | 11/1975 | Godbersen | 414/534 |
| 3,974,924 | 8/1976 | Ullman | 280/414.1 X |
| 4,103,925 | 8/1978 | Palamara | 280/414.1 |
| 4,196,502 | 4/1980 | Johnson | 414/529 X |
| 4,210,235 | 7/1980 | Johnson | 414/534 X |
| 4,278,388 | 7/1981 | Johnson | 414/534 |
| 4,329,108 | 5/1982 | Godbersen | 414/534 |

Primary Examiner—Leslie J. Paperner
Attorney, Agent, or Firm—John J. Simkanich

[57] ABSTRACT

A utility boat trailer for towing a boat which is capable of carrying a number of different sizes of boats and a number of different hull configurations has a plurality of adjustments on various of its members including position and angle adjustment in order for load bearing rollers used on the trailer to conformably support most boat hulls loaded and carried thereon, thereby minimizing stress on the hull and enhancing the ease of loading and unloading, said trailer also including height and position adjustments for a winch which effects the loading and unloading, the configuration of various of the trailer structural members having reduced mass and enhanced strength design.

22 Claims, 17 Drawing Figures

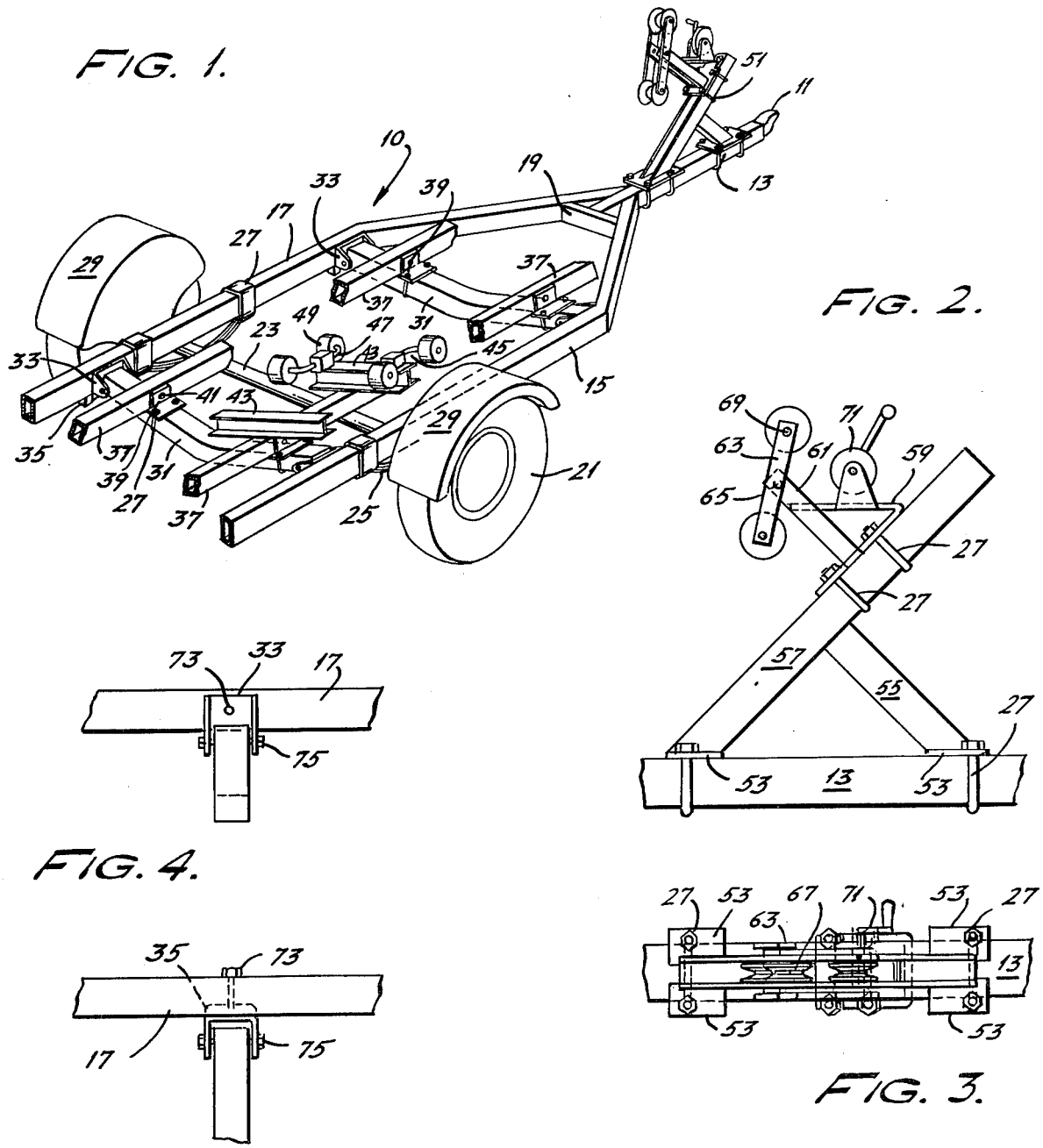

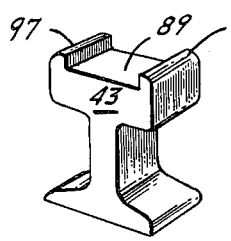
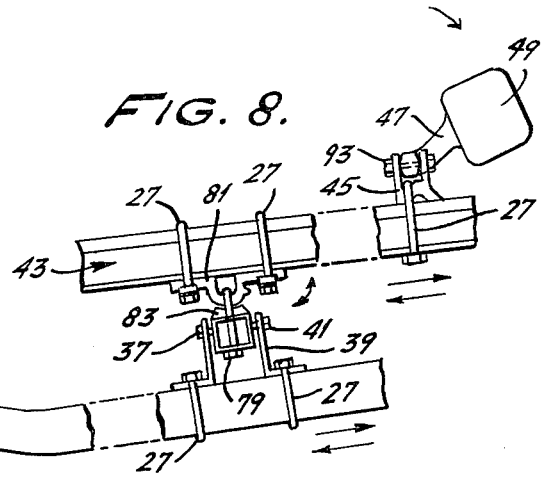
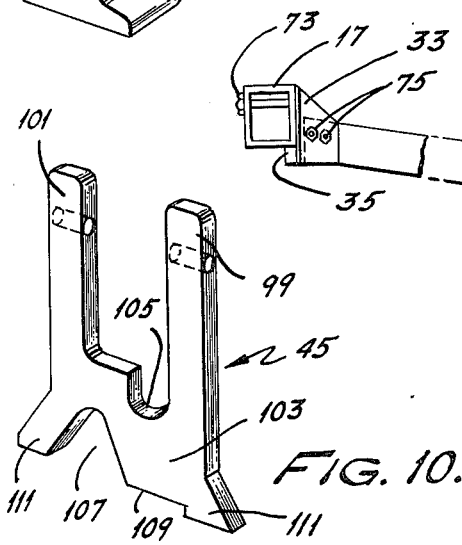
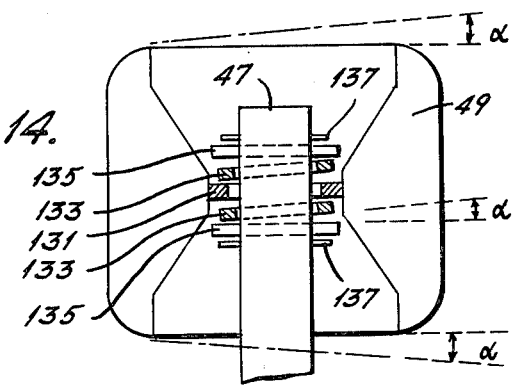
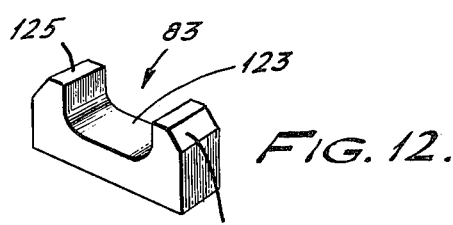
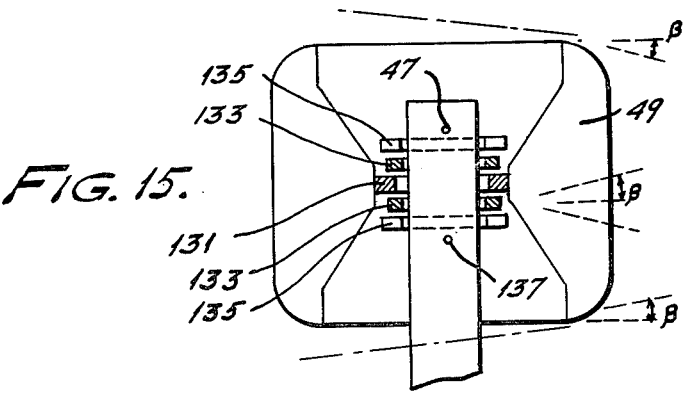
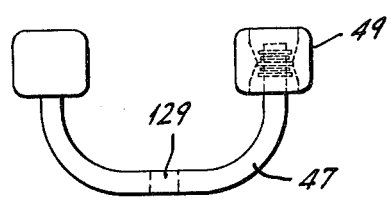
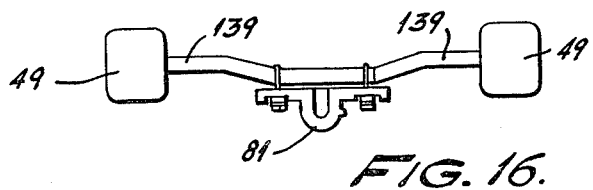
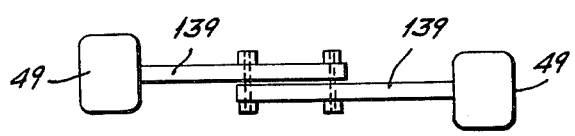

BOAT TRAILER

BACKGROUND OF THE INVENTION

The present invention relates generally to boat trailers and more particularly to a boat trailer with conformable and adjustable supporting apparatus for minimizing stress on the boat hull carried thereby and for ease of loading and unloading.

Because the hull shapes of boats can be quite varied and different in design, a problem has existed for boat trailer manufacturers to provide a trailer which is adaptable to transport boats of different sizes and shapes of hulls. Along with this, of primary importance is the ease of loading and unloading a boat from the trailer.

It has been well known that the use of rollers on the rear end of a boat trailer aids and facilitates the loading and unloading of a boat from the trailer by reducing the friction between the boat and the trailer. These rollers in the past have been made adjustable to conform somewhat to the particular boat being loaded on the trailer by being pivotably mounted on the trailer frame.

While it has generally been known that the use of rollers and roller trucks which are adjustable in both the vertical and horizontal direction will enhance the versatility of a boat trailer for handling a plurality of different boat hull designs and sizes, improvements continue to be developed wherein the improved designs better conform to boat hull configurations.

Johnson, U.S. Pat. No. 3,155,249 has taught a boat trailer with longitudinal fulcrumed levers pivotable in a longitudinal plane of the trailer. These levers carry roller trucks which are pivotable in a transverse plane to the longitudinal axis of the trailer. The roller trucks therefore are capable of dropping down during loading and unloading of a boat from the trailer as the levers pivot, and also independently pivoting at an angle in transverse plane to conform to the hull shape of the boat loaded thereon.

Flachbarth et al, U.S. Pat. No. 3,403,798, teaches a pair of longitudinal members positioned on a cross support at the rear of the trailer, each of these longitudinal members being pivoted in the middle of its length to act as a lever. These members tilt to aid in loading and unloading of a boat and operate in conjunction with a centrally fixed keel roller.

Calkins, U.S. Pat. No. 3,512,667, teaches a boat trailer having at least one U-shaped hull support cradle. This U-shaped structure is pinned to the side rails of the trailer for pivoting in a longitudinal plane. The back end of this cradle carries a roller on each end which is pivotable in a transverse plane.

Johnson, U.S. Pat No. 3,756,439, teaches boat trailer supports pivotable in both the longitudinal and transverse planes about separate pivot points and having a transverse support bar for maintaining the alignment of the boat hull support rollers.

Calkins, U.S. Pat. No. 3,785,677, provides a boat trailer with U-shaped support cradle carrying a plurality of rollers at both the front and back ends thereof. The rear rollers are pivotable in a transverse plane. The cradle is self-balancing for even distribution of weight forces on a boat carried thereon.

Rogers, U.S. Pat. No. 3,812,986, provides a boat trailer having at least one C-shaped or U-shaped pivotable carriage with a plurality of roller trucks thereon. Each roller truck includes a fulcrumed lever bar which is slightly curved into a handle-bar shape.

Cox, U.S. Pat. No. 3,888,367, provides a boat trailer having a plurality of roller trucks pivotable in transverse planes, said roller trucks being in a "H" configuration of four rollers each.

Moore, U.S. Pat No. 3,892,320, provides a boat trailer with multiple rocking boom suspension. This trailer has roller trucks in sets of four rollers. A pair of rollers are mounted, one at each end of a U-shaped bar. Each U-shaped bar is mounted on an individual one rectangular solid rod. The rods are clamped together in pairs to configure a four roller "H" configuration truck. An adjustment can be made on the spacing of the U-shaped bars by sliding the adjacent rectangular rods together or apart from one another.

Godbersen, U.S. Pat No. 3,917,087, provides a boat structure where the rear horizontal cross member itself is pivotable to aid in loading and unloading of a boat hull.

Ullman, U.S. Pat No. 3,974,924, provides a boat trailer having a compound cantilevered stern and loading subframe on a rigid structural cross member.

Johnson, in U.S. Pat No. 4,196,502 and U.S. Pat No. 4,210,235, provides two variations of a roller configurations where the roller itself is permitted to wobble or move in a 360 degree orientation to the shaft upon which it is mounted. This wobble is facilitated by a hemispherically shaped bearing surface which is a part of the roller and the surface upon which the roller is caused to rotate.

Johnson, U.S.at No.4,278,388, provides a trailer having a truss type winch support and a stern end roller truck structure mounted to a subframe where the main crossbar support itself pivots about an axis positioned below the main structural side rail of the trailer.

An object of the present invention is to provide a boat trailer of a design which is conformable to various boat hull shapes and sizes and which allows for a plurality of adjustments of various of its members including position and angle.

A second object of this invention is to provide such a boat trailer where the structural members are of reduced weight while maintaining the necessary strength for the desired function.

An additional object of this invention is to provide such a boat trailer where its structural members are of a design which is economical to manufacture.

A further object of this invention is to provide such a boat trailer with a winch stand which is variably positionable on the trailer frame and which is adjustable as to the height of the winch.

A further object of this invention is to provide such a boat trailer with hull support roller trucks which pivot in a longitudinal plane on a subcarriage support member.

A further object of this invention is to provide fulcrumed roller support levers of reduced mass and weight and enhanced strength, these support members providing an adjustment for varying the distance between roller pairs.

An even further object of this invention is to provide articulated rollers which wobble or change orientation on their support.

An additional object of this invention is to provide such articulated rollers wherein the wobble permitted in one plane is greater than the wobble in the second plane.

SUMMARY OF THE INVENTION

The objects of this invention are realized in a towable boat trailer having a pair of perimeter or side rails mounted on a wheel and axle framework to provide the main structural support for a boat hull carried by the trailer. A plurality of fixed cross rails of a bowed configuration extend between the side rails. A plurality of support levers are mounted, each having a fulcrum on a cross member and being pivotable in a longitudinal plane of the trailer. Levers of reduced mass design are mounted to pivot in a transverse plane of the trailer and each carry a pair of rollers on individual pivot supports fixedly positionable along the transverse planar lever.

Each bowed cross rail is underslung on the side rails to provide a lower profile to the trailer and boat carried thereon and clearance for the keel strut of a boat. Each longitudinal planar lever is adjustable as to its position and fulcrum point with respect to the center line of the trailer. Each transverse planar lever is fixedly positioned along the respective longitudinal planar lever upon which it is mounted, while a support for each roller pair is fixedly adjustable along its respective transverse planar lever upon which it is mounted.

Pivot supports for both the longitudinal planar levers and transverse planar levers resist torque on these levers as a boat hull is loaded or unloaded.

A clearance is provided between the bearing surface upon which a roller body operates and the shaft upon which the roller is mounted, thereby enabling the roller to wobble on the shaft to provide minute conformations to hull shape. Spacer washers on the roller mounting shaft are used to inhibit roller wobble to a narrower angle of articulation along an axis parallel to the longitudinal axis of the trailer than is permitted in a transverse axis.

DESCRIPTION OF THE DRAWINGS

The advantages, features and operation of this invention will be better understood from a reading of the following detailed description of the invention in conjunction with the attached drawings in which like numerals refer to like elements and in which:

FIG. 1 is a perspective view of a partial assembly of the boat trailer showing at least one of each of the plural structural features of the trailer;

FIG. 2 is a side elevational view of the adjustable winch stand support;

FIG. 3 is a top view of the winch stand of FIG. 2;

FIG. 4 shows a detail of the underslung cross rail support bracket;

FIG. 5 is a top view of the cross rail to side rail connecting bracket of FIG. 4.

FIG. 6 shows a perspective view of the cross rail support bracket with its position maintaining bar.

FIG. 7 shows a partial side view of a typical longitudinal planar lever mounted on a cross rail and the transverse planar lever and roller pair supported thereon, this structure being viewed from the side of the trailer.

FIG. 8 shows a broken side view of a typical cross rail member and its connection to a side rail of the trailer as seen from the rear of the trailer, including an end view of a longitudinal planar lever and side view of the transverse planar lever with roller pair and roller pair support mounted thereon.

FIG. 9 is a perspective end view of transverse planar lever.

FIG. 10 is a perspective side view of a roller support member.

FIG. 11 is a perspective side view of a pivot member for supporting a transverse planar lever.

FIG. 12 is a perspective side view of the bearing pad or journal for the pivot member for the transverse planar lever of FIG. 11.

FIG. 13 shows the U-shaped roller support bar with a pair of rollers mounted thereon.

FIG. 14 shows a cross sectional view of the roller of FIG. 13 taken in the plane of minor articulation or wobble.

FIG. 15 shows a cross sectional view of the roller of FIG. 13 taken in the plane of major articulation or wobble.

FIG. 16 shows an alternate embodiment wherein the U-shaped roller support bar and extruded transverse planar lever are replaced by a pair of rectangular roller support rods clamped together and onto the pivot member, each individual rod carrying an individual roller on the free end thereof.

FIG. 17 shows a top view of the structure of FIG. 16.

DETAILED DESCRIPTION OF THE INVENTION

A boat trailer, FIG. 1, provides a towable trailer structure 10 for loading and unloading, as well as, carrying a variety of different size boats of various hull configurations. The trailer 10 has a trailer hitch 11 of standard design mounted to the end of a straight tubular rectangular steel trailing bar 13, this trailer bar 13 being bolted to a pair of bowed side rails 15, 17. The side rails 15, 17 are each made of rectangular steel tube material of a size and strength similar to the trailing bar 13 and are bolted together at the front of the trailer with the use of a truss bar 19 to provide a skeletal shape frame which is outboard of a boat hull carried thereon.

A twin wheel 21 and axle 23 subassembly supports the side rails 15, 17 by use of a pair of leaf springs 25. A leaf spring 25 is clamped to each of the side rails 15, 17 in a standard manner by the use of U-bolts 27 and to the axle 23 near a wheel 21. The wheel 21 and axle 23 subassembly is of a standard design which is commercially available from many sources. A fender 29 is bolted to each of the side rails 15, 17 above each of the respective wheels 21. These fenders 29 can carry reflectors and stop lights which are commercially purchased and not shown in the drawing, FIG. 1. Tandem wheel and axle subassemblies can be used for larger trailers.

While the trailer 10 can include a plurality of cross rails 31 depending upon the size range of boats for which the trailer 10 is intended, smaller sized trailers 10 will carry a pair of these cross rails 31, one positioned at the front of the trailer while the second is positioned at the rear of the trailer.

Each of the cross rails 31 is made of rectangular steel tube material and is bowed in the middle to be lower there and provide a lower profile to the trailer structure as well as clearance for a hull keel strut. Each cross rail 31 is connected to the side rails 15, 17 by a pair of hanger brackets 33 bolted to each of the side rails 15, 17. A pair of stop bars 35 are mounted on either side of hanger bracket 33. A rectangular stop bar 35 is welded to the back of the bracket 33 at a point where it will meet and seat against the bottom of side rails 15, 17, and maintains the fixed position and orientation of each hanger bracket 33 on the side rail. In situations where the clearance needed for a hull keel is not as great, the cross rails 31 need not be bowed.

A pair of levers 37 is mounted, one on each side of the center line of the boat trailer on each of the cross rails 31 to pivot in a respective individual longitudinal plane of the trailer 10. These longitudinal planar levers 37 are made of rectangular steel tube material. Each lever 37 is mounted to pivot between a pair of L-shaped bracket plates 39 which are juxtaposed and secured to a respective cross rail 31 by U-bolts 27. The bracket plates 39 and a center bolt 41 extending therebetween provide a fulcrum above the cross rail 31 about which each of the longitudinal planar levers 37 pivots. Each lever 37 operates independently of another and is independently positionable along a cross rail 31.

A lever 43 is mounted for pivotal rotation in a transverse plane of the trailer 10 on each end of each longitudinal planar lever 37. Each such transverse planar lever 43 carries a support 45 on each end. Each support 45 carries a U-shaped bar 47 with rollers 49 on each end.

A winch stand 51 is positionably clamped to the trailer bar 13 adjacent to the hitch 11.

The winch stand 51, FIG. 2, can be positioned along the trailer bar 13 by securing a pair of U-bolts 27 to a pair of split base plates 53. Each base plate 53, FIGS. 2, 3, is rectangularly shaped and made in two separate pieces to be slightly wider than the rectangular tube from which the trailer bar 13 is constructed. These base plates 53 are made of steel with U-shaped cutouts on either side thereof through which a U-bolt 27 extends for clamping.

A shorter and a longer steel rectangular tubular members 55, 57 are welded together and welded one each to each of the base plates 53 to form a triangular truss. The welds with the respective leg members 55, 57 holds the two pieces comprising each plate 53 together. While the angle at which the shorter and longer legs 55, 57 meet can be 90° as shown in FIG. 2, this angle can be varied during the construction of the winch stand 51 to make the stand 51 taller or shorter. With the shorter and longer legs 55, 57 and base plates 53 welded together to form the truss, the base plates 53 act as the feet of the truss with the longer leg 57 angled towards the front of the trailer 10. The space between sections of each base plate 53 allows for drainage from each leg 55, 57.

A "V" shaped angle plate 59 is bolted to the top side of the upper end of the longer leg 57. The angle of this "V" 59 is adjusted to provide a mounting surface which can be approximately parallel to the top face of the trailer bar 13 but need not be so This "V" shaped plate 59 is made of steel with two pairs of U-shaped cutouts on either side thereof through which a pair of U-bolts 27 extend to positionably clamp on side of the "V" shaped angle plate 59 along the longer leg 57 with the open side of the "V" facing the rear of the trailer 10. The "V" shaped plate 59 can also have a bend in its top side, adding to its rigidity.

Welded to either side of the "V" shaped angle plate 59 and extending upwardly, as an example perpendicularly to the lower leg 57, but not necessarily at that angle, is a pair of juxtaposed support bars 61. Each support bar is rectangularly shaped and made out of flat steel stock. Pinned to the free end of each support bar 61 is a roller support arm 63. Each roller support arm 63 is pinned at its midpoint by means of a bolt 65 or pin or other means which permits it to rotate about the end of its respective support bar 61.

A "V" shaped commercially available keel roller 67 is mounted for rotation between each of the pairs of roller support arms 63 and at the ends thereof by a shaft 69 connecting respective ends of each roller support arm 63.

A commercially available winch 71 is mounted to the top surface of the "V" shaped angle plate 59.

The hanger brackets 33 which connect each of the cross rails 31 to the side rails 15, 17 are shown in detail in FIGS. 4, 5 and 6. Here each hanger bracket 33 is secured to one of the side rails 17 by a single large bolt 73. Each bracket 33 is approximately "C"-shaped having a single hole drilled through the back thereof for passing the large bolt 73. The side plates of each hanger bracket 33 taper toward the side rail 17 from a midpoint on the outer edge to the top thereof for removing unneeded metal above the point where each cross rail 31 stops. Each hanger bracket 33 is higher than the height of each of the side rails 15, 17 and is mounted with its top even with the top of the side rail 17 in order to hang each cross rail 33 below its respective side rail 15, 17 thereby lowering the profile of the trailer 10. A pair of cross bolts 75 extend through each side plate of each hanger bracket 33 and through the midsection of each cross rail 31 to hold the cross rail 31 to the hanger bracket 33.

A single rectangular bar 35, as long as the bracket 33 is wide, is welded to the back of a bracket 33 to extend outwardly and snugly fit along the underside wall of each side rail 15, 17. This rectangular bar 35 holds the hanger bracket 33 in a precise position with respect to its respective side rail 17 (15) and eliminates pivoting of the bracket 33 about the large bolt 73.

The slight downward bow of each cross rail 31 allows for clearance of the bottom of the boat hull as seen in FIG. 8.

Each pair of bracket plates 39, FIG. 7, being juxtaposed to form the pivot fulcrum, is slidable along its cross rail 31 by loosening the tie down U-bolts 27. Each of these L-shaped brackets 39, as shown in FIG. 7, is slightly wider than a cross rail 31 to provide an overhang on the outer edge thereof for a pair of U-shaped holes for acting in conjunction with the U-bolts 27 to clamp the brackets 39. The vertically extending leg of each bracket plate 39 must be long enough, sometimes longer than the other leg, to provide a support above the cross rail 31 for the pivot bolt 41 for holding the longitudinal planar lever 37 sufficiently above the cross rail 31 to allow this lever 37 to pivot about the axis of the bolt 41. The longitudinal planar lever 37 is a rectangular steel tube. A pair of circular rods 40 are welded, one on either side of the bracket plates 39, to the underside of a longitudinal lever 37 to act as stops and limit rotation of that lever from 10° to 20°.

A fixed position U-bolt 79 is mounted to each end of each longitudinal planar lever 37 by extending through holes drilled along the center line of that tubular lever 37.

The fixed position U-bolt 79 holds a pivot member 81 and bearing pad 83 to each longitudinal planar lever 37. Each pivot member 81 rests and operates on its associated bearing pad 83, while the bearing pad 83 fits atop its longitudinal planar lever 37. The fixed position U-bolt 79 wraps about both the pivot member 81, a portion of which is U-shaped for receiving this U-bolt 79, and the bearing pad 83.

Each transverse plane member 43 is an "I"-beam shaped beam 43 and is clamped to a pivot member 81 by a pair of U-bolts 27 each having a respective clamping plate 87.

The top flange of the "I" beam 43 carries a channel 89 in which a roller support 45 is held adjacent each end of the "I" beam 43 by another U-bolt 27. This roller support 45 rests in the top channel 89.

A pivot bolt 93 extends through the roller support 45 parallel to the longitudinal axis of the "I" beam 43. This pivot bolt 93 pins the middle section of a U-shaped bar or arm 47 which has a rubber roller 49 mounted for rotation on each end. The U-shaped roller support bar 47 acts as a roller 49 mounting shaft and is pivotable on the roller support 45 about the pivot bolt 93.

Each "I" beam 43 is identical in size and shape and can be made of extruded metal such as aluminum for low mass and light weight while maintaining sufficient strength for its purpose, FIG. 9. The top flange channel 89 is formed by a pair of longitudinal upstanding lips 97 extending upwardly on each side of the top flange. All faces of the "I" beam 43 meet in a curved radius to reduce stress forces at those points.

Roller support 45, shown in side elevation in FIG. 10, is likewise made of extruded aluminum and has a pair of juxtaposed upstanding plates 99, 101 connected to a base portion 103. This base portion 103 has beveled feet to give it a wider stance while bringing the two upstanding plates 99, 101 closer together. A U-shaped groove 105 extends across the top inward face of the base portion 103 adjacent and inboard to the first upstanding plate 99 and receives the U-bolt 27 which clamps the roller support 45 to the "I" beam 43. In use, the boat hull force or weight acts outwardly from the longitudinal or center line of the trailer. As such the first upstanding plate 99 of the roller support 45 is under a tension while the second upstanding plate 101 is under a compression.

A "V" shaped groove 107 extends across the bottom of the roller support 45 adjacent to the second upstanding plate 101. This "V" shaped groove 107 represents removal of unneeded structural material which has been removed to save weight. A portion of the bottom of the roller support 45 has been removed to form the step 109 between the "V" shaped groove 107 and the edge of the roller support 45 beneath the first upstanding plate 99. This step 107 creates two feet 111 on either side of the bottom of the roller support 45. By providing such spaced apart feet 111 irregularities in the extrusion of the roller support 45 are minimized and a steady base or stance upon the "I" beam 43 is achieved. The roller support 45 is almost as wide as the space between the upstanding lips of the "I" beam 43 and fits neatly within the top channel 89.

The pivot member 81 and bearing pad 83 are shown in FIGS. 11 and 12, respectively. Each of these members 81, 83 can be made of extruded aluminum to save weight and each can have a width approximately equal to the width of the "I" beam 43.

The pivot member 81 has a centrally positioned U-shaped rocker portion 115 with a projecting ridge 117 extending along the width thereof at a position laterally and on the outside radius of this rocker portion. A two piece top plate 119 extends approximately laterally from the top outside edge of each side of the U-shaped rocker portion 115. Each top plate portion 119 carries a laterally extending shallow rectangular groove 121 near the outside underedge thereof. Each of these grooves 121 receives a respective one of the clamping plates 87.

The bearing pad 83 is essentially rectangular with a U-shaped journal surface 123 extending laterally thereacross. This journal surface 123 has a curvature similar to the rocker portion 115 of the pivot member 81 and is the journal in which the pivot member 81 operates. The rocker portion 115 is capable of rotating within the U-shaped journal 123 to the point where the protruding ridge 117 contacts the top face 125 of the bearing pad 83. This ridge 117 limits the angle of rotation on one side of the pivot member 81. Each of the longitudinal outside faces of the bearing pad 83 is provided with a beveled corner 127.

Each U-shaped roller support bar 47 has a hole 129 extending through its midpoint upon which this bar 47 rotates. This hole extends parallel to the ends of the bar 47 and parallel to the main axis of the "shaft" portion on which each of the rubber rollers 49 operate.

Each of the rubber rollers 49 can be purchased commercially from Lake Rubber Company of Willoughby, Ohio. These rollers 49 have an embedded central steel washer 131 which forms the bearing structure of the roller 49. Each end of the bar 47 has been machined to provide a smooth surface or shaft upon which the bearing washer 131 and therefore the roller 49 operates. The outside diameter of this machined surface of the bar 47 has been reduced to provide a loose fit for the center hole opening of the washer 131 which will enable a wobbling of the washer 131 and therefore the roller 49 on the bar 47 about an angle of rotation of about 15 degrees.

Positioned on each side of the roller washer 131 is a plastic spacer washer 133. The pair of spacer washers 133 have a central hole which has an opening approximately equal to the size of the hole in the steel bearing washer 131 and enables the plastic spacer washers 133 to cant or wobble on the bar 47 through an angle of approximately 15 degrees. A pair of steel keeper washers 135 is positioned, one each, outwardly from each of the plastic spacer washers 133. These outboard pair of steel washers 135 have a center opening identical to the spacer washers 133 and the roller washer 131 and permit an articulation about an angle of about 15 degrees. These outboard washers 135 are each made of steel. A pair of roll pins 137 pass through the bar 47, one on each outboard side of each outboard washer 135. Each of these roll pins 137 extend in a plane parallel to the plane of the U-extension of the bar 47 and are spaced a distance from each respective outboard washer 135 to establish a limit of articulation or wobble of the washers 133, 135 and washer 131 through an angle of approximately five degrees as these washers bump against one another on the roll pins 137.

This structure therefore allows each of the rollers 49 to wobble or articulate about the axis of its respective bar and shaft 47 through an angle of about 15 degrees in a vertical plane, while being limited to a wobble of an angle through about five degrees in a horizontal plane. Such wobble allows a necessary confirmation of each of the respective rollers 49 with the boat hull while eliminating or reducing any cocking of each of the rollers 49 which would hinder the loading or unloading of the boat hull.

For smaller trailers handling lighter boats the "I" beam 85, roller support 91 and U-shaped bar 47 and associated structure can be replaced with a pair of slightly bent roller support rods 139, FIGS. 16, 17. Each rod 139 carries on its free end a roller 49 with a wobble permitting structure described hereinabove in connection with FIGS. 14 and 15. A pair of U-bolts 27 clamp each of the rods 139 together and to the pivot member 81. By adjusting each of the U-bolts 27, the composite length of the paired roller support rods 139 can be adjusted as well as the space between their respective end rollers 49.

Many changes can be made in the above-described boat trailer structure without departing from the intent or scope thereof. It is intended that all matter contained in the above description, therefore, shall be interpreted as illustrative and not be taken in the limiting sense.

What is claimed is:

1. A boat trailer for carrying a boat and for loading and unloading said boat, said trailer including a wheel support frame having a pair of side rails; means for hitching said trailer frame to a towing vehicle and means for cradling said boat, the improvement comprising:
    a pair of hanger brackets, one each attached to each of said side rails, each said hanger bracket being attached to its respective side rail by a single pin, said bracket extending below its respective side rail;
    a positioning bar attached to the back face of each hangar bracket, said positioning bar abutting the underside of said side rail and holding said hanger bracket in fixed position to said side rail when said bracket is pinned thereto;
    a downwardly bowed cross rail rigidly fixed between said pair of hanger brackets at said position on said brackets extending below said side rails; and
    wherein said cradling means includes a plurality of roller support means for carrying the weight of said boat, each of said roller support means being independently rotatable in a longitudinal axis of said trailer and being independently positionable along said cross rail.

2. The trailer of claim 1 wherein said plurality of roller support means each includes:
    a first fulcrum secured to said cross rail;
    a longitudinally extending first lever mounted to said first fulcrum for pivotal rotation;
    second and third fulcrums secured, one to each end of said first lever;
    transversely extending second and third levers mounted, respectively, to said second and third fulcrums for pivotal rotation, said second and third levers being I-beams with adjacent flange lips outstanding to form a channel on the exterior flange;
    fourth and fifth fulcrums secured within said exterior flange channel one to each end of said second lever and sixth and seventh fulcrums secured within said exterior flange channel one to each end of said third lever;
    longitudinally extending fourth, fifth, sixth and seventh levers mounted to said fourth, fifth, sixth and seventh fulcrums, respectively, for pivotal rotation; and
    a plurality of rollers mounted for rotation, one on each end, of said fourth, fifth, sixth and seventh levers.

3. The trailer of claim 2 wherein each of said rollers are mounted for articulated rotation on each said respective end of said fourth, fifth, sixth and seventh levers.

4. The trailer of claim 2 wherein said permitted roller articulation is greater along an axis perpendicular to the longitudinal axis of said trailer than along said longitudinal axis.

5. The trailer of claim 4 wherein said second and third I-beam levers are of extruded aluminum material.

6. The trailer of claim 5 wherein said first lever is a rectangular steel tube; wherein said fourth, fifth, sixth and seventh levers are curved bars having machined shaft end portions; wherein said rollers each contain bearing washers which operate upon said machined shaft end portions enabling a wobble cant of about 15 degrees; and a plurality of pins extending through said machined shaft end portions, one each outboard each bearing washer, said pins limiting said wobble cant to about 5 degrees along a plane of its extension.

7. The trailer of claim 6 wherein said first fulcrum includes a pair of juxtaposed L-shaped plates clamped to said cross rail; and wherein said second and third fulcrums each include a curved bearing pad seated on said rectangular steel tube and a V-shaped rocker extrusion operating in said bearing pad, said rocker extrusion and said bearing pad being clamped together and to said rectangular steel tube with a single clamp on one hand, said rocker extrusion being clamped to an I-beam lever on the other hand.

8. The trailer of claim 7 wherein said fourth, fifth, sixth and seventh fulcrums each include a support member clamped within the flange channel of a said I-beam lever, said support member having a pair of juxtaposed upwardly extending plates, connected to a base portion having beveled feet extending outboard said upwardly extending plates, a pivot shaft extending between said plates, a U-shaped groove extending across the top face of said base portion adjacent the inboard one of said upwardly extending plates, said groove receiving a U-bolt which clamps to said I-beam lever, and a V-shaped groove in the bottom of said base member adjacent the outboard one of said upwardly extending plates.

9. A towable boat trailer comprising:
    a wheel pair and axle subassembly;
    a pair of side rails mounted on said wheel subassembly;
    a plurality of fixed cross rails of bowed configuration extending between said side rails;
    a plurality of independently operating first support levers mounted each having a fulcrum on a cross member and being pivotable in a longitudinal plane of said trailer, said support levers each being independently positionable along said cross rail;
    a plurality of roller second support levers carried on each said first support lever and being pivotable in a transverse plane of said trailer;
    a plurality of boat contacting rollers carried by each said roller support lever, wherein each said rooller is permitted to articulate on its respective support, said articulation being permitted to a greater angle in a first direction and a lesser angle in other directions being minimal in a second direction orthogonal to said first direction.

10. The trailer of claim 9 wherein each one of said roller second support levers is mounted on each end of each said first support lever, and wherein each said roller second support lever includes:
    an I-beam member pivoted for rotation in a transverse plane of said trailer about a fulcrum point on said support lever; said I-beam member having a channel in its topmost flange formed between a pair of upstanding lips thereof;

a pair of supports secured one each to a separate end of said I-beam member within said channel;

a bar attached to each said support and pivotable thereon; and wherein one of said rollers mounted for said articulation on each end of said bar.

11. The trailer of claim 10 wherein each said bar is curved and has a smooth shaft portion at each end thereof; wherein each roller includes a center bearing member having a bore oversize of said shaft portion diameter permitting articulation thereon, at least one washer positioned on each side of said bearing member, and a first and second rigid pin each extending through said shaft member parallel to one another on respective outboard sides of said washers, said pins limiting articulation of said bearing member, by contact therewith, to a lesser angle in said pin direction of extension.

12. The trailer of claim 11 also including:

a tow bar attached to said side rails and extending forward thereof;

a trailer hitch mounted to the free end of said tow bar;

a winch stand clamped to said tow bar and positionable therealong, said winch stand having an adjustment for the height of the winch.

13. The trailer of claim 9 also including:

a tow bar attached to said side rails and extending forward thereof;

first and second plates each clamped to said tow bar;

a first shorter tube welded to said first plate;

a second longer tube welded to said second plate and to the free end of said first tube at a midpoint on said second tube, said second tube having an upper end;

a V-shaped plate clamped to said second tube and adjustably positionable therealong;

a winch mounted on the top face of said V-shaped plate;

a pair of support bars attached to either side of said V-shaped plate and extending outwardly therefrom; and v shaped roller means attached between said pair of support bars.

14. The trailer of claim 13 wherein said first and second plates are each of two independent portions, being spaced apart, said two independent portions being held in fixed relation to one another by said welds to said first and second tubes, said space providing an opening to the bottom end of each of said first and second tubes.

15. A towable boat trailer, said trailer including a wheel and axle subassembly, at least one longitudinal support rail mounted on said wheel and axle subassembly, means for hitching said support rail to a towing vehicle, and means for supporting said boat being connected to said dupport rail, the improvement comprising:

a plurality of boat contacting rollers carried by said supporting means, said rollers each being mounted on a roller shaft connected to said supporting means, each roller being capable of articulated rotation on its respective shaft, said articulation being permitted to a greater degree along an axis perpendicular to the longitudinal axis of said trailer and to a lesser degree along an axis perpendicular to said axis of greater articulation.

16. The trailer of claim 15 wherein said supporting means includes a plurality of shaft, a respective one of said rollers mounted on a respective one of said shafts for rotation thereon, said articulation of a respective roller being with respect to a said shaft each roller having a center washer portion thereof upon which said roller turns on said shaft; said supporting means also including for each roller a pair of spacer washers positioned outboard said center washer, a pair of keeper washers positioned outboard said spacer washers on said shaft, one each on each side, and a pair of rigid retaining pins extending parallel to one another and positioned one each through said shaft on the outside of each keeper washer.

17. The trailer of claim 16 wherein said center washer, pair of spacer washers and pair of keeper washers center holes are larger than said shaft diameter, permitting each to cant and articulate on said shaft, and wherein said retaining pins are positioned to extend parallel to the longitudinal axis of said trailer.

18. The trailer of claim 17 wherein said lesser articulation is about from 0° to 5°.

19. The trailer of claim 18 wherein said greater articulation is about from 10° to 20°.

20. A towable baot trailer, said trailer including a wheel and axle subassembly, at least one longitudinal support connected to said wheel and axle subassembly, means connected to said longitudinal support for hitching to a towing vehicle, means for supporting said boat being connected to said longitudinal support, a winch, and a winch support connected to said longitudinal support, wherein said winch support includes:

a first and second plates clamped to said longitudinal support, said plates each having a first and second portions separated by a space;

a first vertical-angle extending tube member attached to said first first and second portions, with the bottom of said first tube opening onto said space between said portions;

a second vertical-angle extending tube member attached to said second first and second portions, with the tube bottom of said second tube opening onto said space between said portions, said second tube member also attached to said first tube member, said second member extending vertically above said first member; and an angle plate adjustably clamped to said second member, said angle plate having a portion extending outwardly from said second member upon which said winch is mounted is mounted.

21. A towable boat trailer, said trailer including a wheel and axle subassembly, at least one longitudinal support rail mounted on said wheel and axle subassembly, means for hitching said support rail to a towing vehicle, and means for cradling said boat being connected to said support rail, the improvement comprising:

wherein said cradling means includes a plurality of levers each extending in planes transverse to a longitudinal axis of said trailer, and including a boat contacting member, said levers each having an I-beam shape with a channel extending along the top flange, said channel being formed by the upstanding lips of said flange, said boat contacting member being received in said channel.

22. The trailer of claim 21 wherein each I-beam lever is clamped at the midpoint on its length to an individual pivot member, each said pivot member including a U-shaped rocker portion having a ridge on one side thereof to limit movement and a top plate portion clamped to said I-beam lever, and wherein said cradling means also includes a plurality of bearing pads, paired one each with each pivot member, said bearing pad having a curved surface in which said pivot member rocker portion operates and a flat portion against which said ridge operates to limit said movement, each said pivot member and each said respective bearing pad being held together by a U-clamp about said U-shaped rocker portion and said bearing pad curved surface portion.

* * * * *

UNITED STATES PATENT AND TRADEMARK OFFICE
CERTIFICATE OF CORRECTION

PATENT NO. : 4,464,092

DATED : August 7, 1984

INVENTOR(S) : J. Bruce Chambers and Donald D. Paul

It is certified that error appears in the above-identified patent and that said Letters Patent is hereby corrected as shown below:

Col. 11, l. 54, "dupport" should be -- support --.

Col. 12, l. 37, after "second" (first occurrence) -- plate -- should be inserted.

Signed and Sealed this

Twenty-fifth Day of December 1984

[SEAL]

Attest:

*Attesting Officer*

GERALD J. MOSSINGHOFF

*Commissioner of Patents and Trademarks*